United States Patent
Guggenmos et al.

(10) Patent No.: US 10,634,523 B2
(45) Date of Patent: Apr. 28, 2020

(54) OPTICAL ROTATION ANGLE MEASURING SYSTEM

(71) Applicant: Arges GmbH, Wackersdorf (DE)

(72) Inventors: Markus Guggenmos, Schwandorf (DE); Martin Hartmann, Burgthann (DE); Bernhard Kiesbauer, Pleystein (DE); Christiaan H. F. Velzel, Deurne (NL); Sven Pekelder, EG Breugel (NL); Rinze Frederik van der Kluit, LA Eindhoven (NL)

(73) Assignee: Arges GmbH, Wackersdorf (DE)

(*) Notice: Subject to any disclaimer, the term of this patent is extended or adjusted under 35 U.S.C. 154(b) by 0 days.

(21) Appl. No.: 16/098,017

(22) PCT Filed: May 3, 2017

(86) PCT No.: PCT/EP2017/060488
§ 371 (c)(1),
(2) Date: Oct. 31, 2018

(87) PCT Pub. No.: WO2017/191168
PCT Pub. Date: Nov. 9, 2017

(65) Prior Publication Data
US 2019/0145799 A1 May 16, 2019

(30) Foreign Application Priority Data
May 3, 2016 (EP) .................................. 16168184

(51) Int. Cl.
*G01D 5/347* (2006.01)
*G01D 5/38* (2006.01)

(52) U.S. Cl.
CPC ............. *G01D 5/3473* (2013.01); *G01D 5/38* (2013.01)

(58) Field of Classification Search
CPC ......... G01D 5/3473; G01D 5/38; G01B 11/26
(Continued)

(56) References Cited

U.S. PATENT DOCUMENTS 3,955,083 A * 5/1976 Collins .................... G01B 9/02
250/231.16
5,159,192 A 10/1992 Nishimura et al.
(Continued)

FOREIGN PATENT DOCUMENTS

DE 102011050030 A1 11/2012
EP 651232 A1 5/1995
(Continued)

OTHER PUBLICATIONS

European Patent Office Search Report and Written Opinion dated Jun. 8, 2017 in reference to co-pending International Patent Application No. PCT/EP2017/060488 filed May 3, 2017.

*Primary Examiner* — Seung C Sohn
(74) *Attorney, Agent, or Firm* — Dinsmore & Shohl, LLP (57) ABSTRACT

The present invention is directed to an optical system for measuring the rotation angle of rotatable object having a rotation shaft (2), which system comprises a reflective diffraction element (6) mounted on said shaft and a module that includes a radiation source (8) emitting a monochromatic beam (bo) towards this element and a radiation-sensitive detection structure (14, 16), the diffraction element is configured to project diffraction order images (18) of its pattern onto associated sections (50(1)-54(2)) of an annular grating structure forming part of the detection structure and the surface size of the diffraction element is smaller than 20% of the surface size of the annular grating structure.

16 Claims, 5 Drawing Sheets

(58) Field of Classification Search
USPC .................................... 250/231.13–231.18
See application file for complete search history.

(56) References Cited

U.S. PATENT DOCUMENTS 9,903,743 B2 * 2/2018 Petschik ............ G01D 5/34715
2013/0286394 A1 10/2013 Hopp

FOREIGN PATENT DOCUMENTS

JP           01138413 A     5/1989
JP           03270020 A     12/1991

* cited by examiner

OPTICAL ROTATION ANGLE MEASURING SYSTEM

FIELD OF THE INVENTION

The invention relates to an optical system for measuring the rotation angle of a rotatable object having a rotation shaft, which system includes at the one hand a reflective diffraction element mounted on the shaft and rotating with the shaft and at the other hand a radiation source and detection module, which module comprises:

a radiation source emitting an illumination beam of nearly monochromatic radiation towards the diffraction element; and a radiation-sensitive detection structure, comprising an annular grating mask, converting illumination beam radiation reflected by the diffraction element into electrical signals suitable for electronic processing to obtain signals representing the said angle.

In a particular embodiment the present invention provides an optical system for measuring the rotation angle of rotatable object having a rotation shaft (2), which system comprises a reflective diffraction element (6) mounted on said shaft and a module that includes a radiation source (8) emitting a nearly monochromatic beam (bo) towards this element and a radiation-sensitive detection structure (14,16), the diffraction element is configured to project diffraction order images (18) of its pattern onto associated sections (50(1)-54(2)) of an annular grating structure forming part of the detection structure and the surface size of the diffraction element is less than 20% of the surface size of the annular grating structure. Expressed differently, the surface size of the diffraction element is such that the moment of inertia of the diffraction element is smaller than 0.05 g·cm²; in particular smaller than 0.01 g·cm².

BACKGROUND TO THE INVENTION

A device for measuring a rotation angle, also known as an angular decoder or rotation scanner, can be used to measure the rotation angle of rotatable object having a rotation shaft using the angular position of a mirror that is connected to said rotation shaft. Such a scanner can be widely used. A well known example, consists of a device wherein the mirror is connected to the shaft of a rotation motor, which motor and mirror together form a so-called galvanometer scanner. In manufacturing industry galvanometer scanners can be used for material processing by means of movable laser beams, such as welding, engraving or cutting work pieces. A more recent application is three-dimensional (3D-) prototyping, or printing. In optics, for example confocal microscopy galvanometer scanners are used for controlling X- and Y scanning of laser beams. Galvanometer scanners can also be used in apparatuses for medical treatments of very different types, such as cornea surgery, skin surgery and angioplasty. Also in a so-called fundus camera for scanning a human retina in an X- and Y direction a galvanometer scanner can be used.

In these and other applications the required resolution of the angular decoder is of the order of micro radians. A further requirement is that the scanning mirror can be moved rapidly over larger angles, for example 20 degrees in 1 millisecond. Therefore, the mass of that part of the angular decoder that is coupled to the rotation shaft should be small so that this part ads little to the moment of inertia of the scanner.

The requirement of high resolution and small moment of inertia leads to use of optical metrology in the angular decoder device, thus to an optical angular encoder device. A generally applied principle for measuring movements, including rotation, of objects is based on the use of optical gratings. For example U.S. Pat. No. 5,159,192 discloses a device for measuring the angular position of a galvanometer mirror which device uses a grating that is perpendicularly mounted on the rotating shaft of the mirror. The grating is reflective and ring-shaped and has radial grating lines. A light beam from a diode laser is divided into two sub-beams, which are directed to one and the same area of the grating. The sub-beams reflected by the grating are incident on a mirror, which reflects these sub-beams back towards the grating. Each of the twice-reflected sub-beams is captured by a separate radiation-sensitive detector. The two detector output signals provide information about the angle and direction of rotation of the shaft. To allow measuring angular positions with a resolution of the order of one micro radian the radius of the ring-shaped grating of this device should be of the order of centimeters. Since the moment of inertia of the grating disc is proportional to at least the fourth power of its radius, the required radius would set a limit to the galvanometer dynamics and velocity of the galvanometer mirror. Moreover, the measurement result of the device of U.S. Pat. No. 5,159,192 is sensitive to transverse shifts of the rotating shaft, because such shifts cause transverse displacements of the grating structure in a plane perpendicular the shaft axis and such displacement will change the pitch of the grating area observed by the optical elements of the device.

EP 0 651 232 shows another device wherein a reflective radial diffraction grating mounted on and rotating with a rotary object is used to measure the angular position of this object. This device uses a second, stationary grating to split a measuring beam from a source into two sub beams of different diffraction orders, which sub-beams are incident on different parts of the rotating grating. Sub-beams reflected by the rotating grating are brought to interference by the stationary grating in the plane of a comb type radiation-sensitive detector having a period corresponding to that of the interference pattern. The output signals of the detector provide information about the angular position of the rotary object. The device of EP 0 651 232 shows the same disadvantages as the device of U.S. Pat. No. 5,195,192.

DE Patent 10 2011 050 030 discloses another type of device for measuring the angular position of for instance a galvanometer mirror wherein a diffraction grating is used. In this device a converging beam of light is sent to a diffraction grating having a cylindrical surface that is centered on the rotation axis of the galvanometer via a mirror that is fixed to the rotation shaft of the mirror. The cylindrical grating reflects the beam back to the rotating mirror, which reflects light towards a lens that forms a moving image of this grating in the plane of a stationary grating that is arranged in front of a radiation-sensitive detector. The intensity of light on the detector varies periodically with the angular position of the mirror. For a cylinder radius r=15 mm and a grating period of 10 µm the detector signal will have a period of 0.67 milli radians. Since a convergent beam is used the rotation angle measurement is sensitive to transverse displacements of the rotation shaft. In practice it appears that such displacements of the order of a few micrometers cannot be avoided. A displacement Δx of the shaft in the direction perpendicular to the grating lines causes a measured angle error of Δx/r, wherein r is the radius of curvature of the cylindrical grating. If r=15 mm a displacement of the cylindrical grating over 1 µm will cause an error in angle measurement of 67 microradians, which is unacceptable in view of the measurement resolution now required. Moreover, because of its optical outlay and the number of optical elements, the device of DE Patent 10 2011 050 030 cannot be made compact and lightweight.

SUMMARY OF THE INVENTION

It is an object of the invention to provide an optical rotation angle measuring device that is more simple and compact and delivers a more accurate measurement signal over a larger measurement range than prior devices, and which is less sensitive to transverse displacements of the rotation shaft.

Accordingly the present invention provides an optical system for measuring the rotation angle of a rotatable object having a rotation shaft, which system includes at the one hand a reflective diffraction element mounted on, and rotating with, the shaft and at the other hand a module that comprises a radiation source emitting an illumination beam of nearly monochromatic radiation towards the diffraction element and a radiation-sensitive detection structure converting illumination beam radiation reflected by the diffraction element into electrical signals suitable for electronic processing to obtain output signals representing the said angle, wherein said system is characterized in that the diffraction element is configured to project at least one diffraction order image of its pattern onto associated sections of an annular grating structure forming part of the detection structure and in that the surface size of the diffraction element is smaller than 20%; in particular less than 10% of the surface size of the annular grating structure. Nearly monochromatic as used herein is meant to allow an illumination beam of a given wavelength with a certain spectral width. As further detailed below, the monochromatic wavelength of the illumination source allows certain wavelength errors, wherein each of said wavelengths is allowed to have a certain spectral width. Within the context of the invention, a nearly monochromatic radiation is a radiation at a given wavelength (infra—allowing wavelength variations of ±10 nM) having a spectral width smaller than 100 Mhz; in particular having a spectral width smaller than 10 Mhz; even more in particular having a spectral width smaller than 3 Mhz.

An annular grating structure is understood to mean a structure of grating lines extending in radial directions relative to the illumination beam axis whereby the grating lines are arranged within sections of a ring that is coaxial with the beam axis; within the context of the present invention it should however not be seen as limited to ring shaped but equally includes close to annular and elliptical shapes. The period of the grating structure corresponds to the period of the diffraction order images in the plane of the grating structure. The angular size of the sections, i.e. the size in the circumferential direction of the ring, and the number of sections can be adapted at will and to measuring circumstances and required measurement results. A diffraction order image is understood to mean an image formed by a sub-beam diffracted by the diffraction element in a given diffraction order, such as a +1 or a −1 diffraction order.

The invention is based on the insight that for the envisaged application the diffraction element needs to project images of its pattern only on small sections of the grating structure and that the information content of the diffraction element is substantially smaller than that of a diffraction element which image has to cover the whole circumferential area of a full-ring grating structure. As a consequence, the diffraction element may have a diameter, for example 3 mm that is substantially smaller than the diameter, for example 30 mm, of the stationary grating structure. Compared with a conventional system having the same measurement resolution, the system according to the invention provides the advantage that the inertial load on the angular decoder can be reduced by a factor that is proportional to the fourth power of the ratio of the diffraction element surface size and the size of the disc carrying the annular grating structure, which factor is $\frac{1}{10000}$ in our example.

It is remarked that Japanese patent application JPH03170020 discloses a rotary encoder wherein a reflective hologram is mounted on a rotation axis. In this hologram a code pattern of angular positions is recorded and when this hologram is illuminated by a convergent light beam, this code pattern is reproduced on enlarged scale in an annular ring. A small portion of the reproduced code pattern is read out by an optical sensor array coupled to an electronic processing circuit. This circuit calculates the momentarily angular position of the rotating hologram from that portion of the reproduced code pattern that is read out. The rotary encoder of JPH 03170020 is based on a concept that is different from that used in the system of the present invention.

It is further remarked that Japanese patent application JPH01138413 discloses a rotary encoder, which comprises a reflective hologram mounted on, and rotating with, a rotary body. The hologram is illuminated by a collimated beam and reproduced in a plane wherein two photoelectric convertors are arranged. The hologram shown in JPH01138413 is substantially larger than the diameter of the rotary body and of the same size as a collimator lens arranged between the hologram and the plane of the photoelectric convertors. The light-sensitive areas of these convertors are relatively small so that, already for small movements of the rotation axis the hologram images will shift away from the convertor areas and measurement errors will occur. Also the moment of inertia of the encoder of JPH01138413 is relatively large.

We describe different embodiments of the invention, in which the diffraction element used has in each embodiment a different structure. The type of diffraction element that is used in the invention is called in the optical literature a hologram.

A hologram as used herein, is a diffraction element that, on illumination by a beam of radiation, produces images in a space of a given object structure. In this invention the projected images are annular periodic intensity distributions with a period and radius equal to the period and the radius of the annular detection grating. These images are projected in the plane of the detection structure. The surface configuration of the reflective hologram that we use in the invention is determined by the direction and curvature of the illumination beam, by the position and intensity distribution of the projected images, and by the wavelength of the source of illumination.

A preferred embodiment of the present system is characterized in that the hologram is configured such that it reflects the incident illumination beam radiation in two first diffraction orders. In this way two diffraction images are projected in the plane of the detection grating structure and the system allows a double read-out of the angular position whilst the module still has a simple configuration. Under alternative circumstances only one diffraction image may be used for angular position read-out, which provides cost saving. For a person skilled in the art it is obvious how to design a diffraction element that concentrates the diffracted radiation into one or two diffraction orders.

The source of the illumination beam should be positioned on the axis of rotation of the rotation shaft of the angular decoder, in particular on the axis of rotation of the rotation shaft of a galvanometer. For the axial position of the illuminating source we can have different choices that lead to different embodiments of the invention. In a first embodiment of the invention the illumination beam is a diverging beam; the source of this beam is placed on the same side of the hologram as the detection grating. This embodiment has the advantage of simplicity and low cost, because there are no beam shaping components necessary between the illumination source and the hologram. But this embodiment has two unfavorable properties that are caused mainly by the configuration of the hologram. With a divergent illumination beam, the hologram must have a strong optical power to focus the diffracted radiation in the detection plane. This focusing function can be compared to the focusing of a concave mirror centered on the illuminating source. When the hologram is shifted over a small distance, the diffraction images are also shifted, but over distances twice as large as the shift of the hologram. Because the hologram is fixed on the rotation shaft of the angular decoder, this configuration tolerates only very narrow sideway movements and expansions of the shaft, more in particular in the order of ±10 µm, that are difficult to be realized in the construction of for example a galvanometer scanner. The configuration of the hologram is dependent on a fixed value of the wavelength, i.e. the monochromatic wavelength of the illumination source. When a diode laser is used for illumination, its wavelength can differ for instance over ±5 nm from the given specification. Moreover a change in temperature of the laser will cause a wavelength shift of, for instance 0.2 nm per degree C. Temperature changes in existing galvanometer scanners can be, for instance ±20° C. resulting in possible wavelength changes of ±4 nm around an average temperature. Adding these effects makes wavelength errors of ±10 nm possible. Thus within the context of the present invention, the monochromatic wavelength of the illumination source allows wavelength errors (variations) of ±10 nm possible; in particular wavelength errors (variations) of ±5 nm, for example when a diode laser is used for illumination. For a diode laser with a specification wavelength of =660 nm this means relative wavelength errors $\Delta\tau/\tau = \pm 1/66$. The relative errors of the radial and axial position of the diffraction images in this embodiment will be equal to a first order approximation, to the relative wavelength error. With a radius r of the detection grating of 15 mm we will have a $\Delta r$ sideways shift, hereinafter also referred to as the deflection error $\Delta r$ of ±0.23 mm, with an axial distance Z of 25 mm from the hologram to the detection plane we will have a focus shift $\Delta Z$ of 0.34 mm. These effects can only with difficulty be compensated by the mechanical design of the system, which will increase the manufacturing costs.

Hence, in a second embodiment the illumination beam is made convergent by a lens between the illumination source and the hologram. This means that the chromatic focusing error $\Delta Z$ vanishes; the deflection error $\Delta r$ remains but can be met by making the radial size of the detection structure large enough, for instance ±0.5 mm. Also in this embodiment the positioning orders due to transverse movements of the rotation shaft can be avoided by making the distance between the rotation center of the hologram and the average position of the diffraction image equal to the distance from the rotation center and the virtual image of the illumination source. The position error due to expansion of the shaft will become a factor of about 7 smaller, so that the tolerance for this expansion movements can be up to 70 µm instead of the 10 µm in the first embodiment of the diffraction element. A disadvantage of this second embodiment is that the optical path from the illumination source to the hologram is roughly 3 times as long as in the first embodiment. This problem can be solved partially by folding the optical path in the space above the detection construction. This will make the axial size of the system larger (for example about 10 mm) and will cost extra components such as prisms and/or mirrors.

In a third embodiment a lens will be placed close to the hologram, with the illumination source in the focal plane of this lens. A preferred form of this lens is convex-plane, with the convex side of the lens on the side of the hologram at a suitable distance, such as for example 0.5 mm. This lens provides a plane wave to illuminate the hologram; the diffracted beams are focused by the lens on the pane of the detection grating. The lens can be corrected for spherical aberration and coma; the remaining aberration is astigmatism that can be corrected by the hologram. In this configuration the positioning errors due to transverse movements and expansion of the rotation shaft vanish, and of the chromatic errors also the focusing error $\Delta Z$ does not occur. Thus reducing the errors to the deflection error $\Delta r$ that is the same as in the first and second embodiment.

A preferred embodiment of the present system is characterized in that the diffraction element is configured such that it reflects incident measuring beam radiation in the +1 and −1 diffraction orders.

In this way two diffraction order images are formed in the plane of the annular grating structure and the system allows a double read out of the angular position whilst the module still has a simple configuration. Under circumstances only one diffraction order image may be used for angular position read out, which provides costs saving. For a person skilled in the art it is obvious how to design a diffraction grating that concentrates the diffracted radiation into one or two diffraction orders.

The present optical system may be further characterized in that the annular grating structure comprises a number of grating sectors, which have an angular size that is larger than the angular size of the diffraction order images formed on these grating sectors and in that the radiation-sensitive detection structure comprises for each grating sector a sector detector.

Alternatively, the optical system may be characterized in that the annular grating structure comprises a number of grating sectors, which have an angular size that is smaller than the angular size of the diffraction order images formed on these grating sectors and in that the radiation-sensitive detection structure comprises for each grating sector a sector detector.

According to another aspect, the present optical system is characterized in that the annular grating section is divided into two radially separated sub-gratings having the same grating period and mutually shifted in the tangential direction over a quarter of the grating period and in that for each of these sub-gratings a separate radiation-sensitive detector is provided. This measure allows detection of the rotation direction of the rotation shaft.

In order to allow use of interpolation techniques, the present system is preferably characterized in that the annular grating structure comprises three sub-gratings having different grating periods and each intended for receiving a diffraction order image.

This embodiment may be further characterized in that the annular grating structure comprises three pairs of sectors, each pair being provided with another one of three sub-gratings having different grating periods.

Alternatively the embodiment may be characterized in that the annular grating structure comprises at most two sectors, each sector being provided with the three sub-gratings having different grating periods, which sub-gratings are radially separated.

In another embodiment, a spherical mirror is added to the system of the present invention. By adding a spherical mirror to the system that projects a periodic pattern on a set of detectors, the detector plane (101) can be made flat and perpendicular to the symmetry axis of the system. This makes alignment of the system with the face of the plate (10) carrying the detection structures (16) simpler and also improves the quality of the detector signals.

Thus in a particular embodiment the present invention provides a system for measuring the rotation angle of a rotatable object having a rotation shaft (2), which system includes at the one hand a reflective diffraction element (6) mounted on, and rotating with, the shaft (2) and at the other hand a module that comprises a radiation source (8) emitting an illumination beam of nearly monochromatic radiation towards the diffraction element (6) and a radiation-sensitive detection structure (16) converting illumination beam radiation reflected by the diffraction element (6) into electrical signals suitable for electronic processing to obtain signals representing the said angle, characterized in that the diffraction element (6) is configured to project one or more diffraction images (18) onto associated sections of the detection structure and in that the surface size of the diffraction element (6) is smaller than 20% of the surface size of the associated sections on the detection structure; characterised in that the system further comprises a pherical mirror (100) to project the diffraction images (18) on the detectors.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

Figure 1:
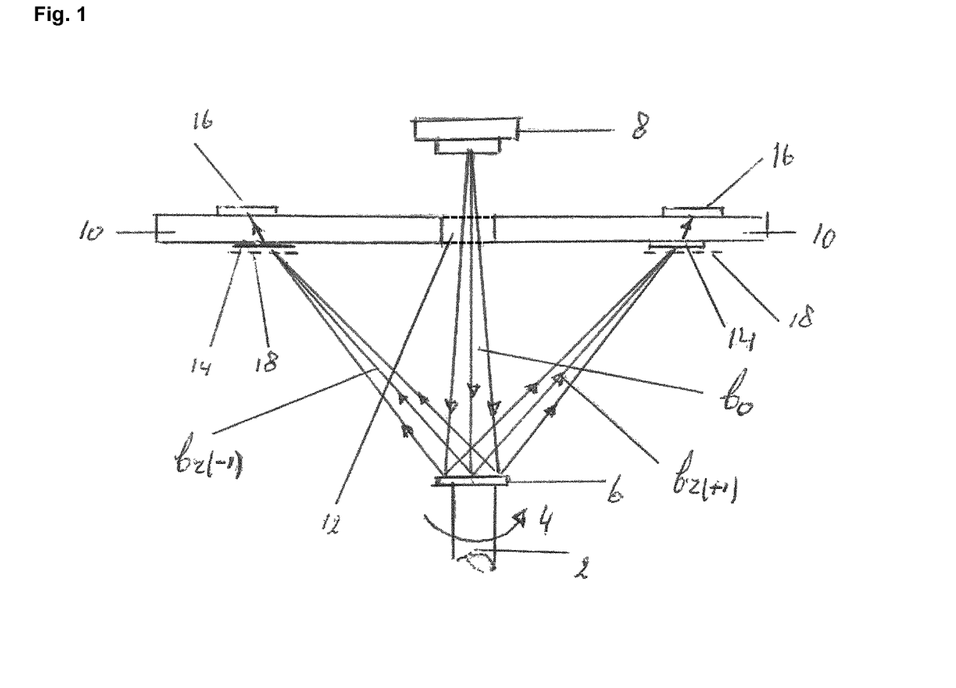
FIG. 1: shows in a first embodiment a principle diagram of the optical system for measuring the rotation angle of an object according to the invention.

FIG. 1 shows the principle diagram of the rotation angle measurement system according to the drawings, which is, for example suitable for measuring the angular position of a galvanometer scanner. The rotation shaft of this scanner is denoted by reference number (2). The mirror (not shown in the Figure) of the scanner is mounted on this shaft, which rotation movement is indicated by arrow (4), but should not be understood as limiting the invention to a single direction of rotation. The rotation shaft can rotate in either direction. On one end face of the shaft and perpendicular to the shaft a small and reflective diffraction element (RDE) (6), in particular a hologram (31) is mounted. The diffraction element (6) is illuminated by a spherical radiation beam bo emitted by a monochromatic radiation source, preferably a diode laser (8), which is arranged in line with the rotation axis of shaft (2). The diffraction element splits incident beam bo in sub-beams of different diffraction orders and reflects these sub-beams towards a static mask structure that may be composed of grating sections. A shown in FIG. 1 such grating sections (14) may be arranged at the lower face of a plate (10) that is transparent at least at the positions of the grating sections (14). In the embodiment of FIG. 1 plate (10) is a round disc, which may have a central opening (12). The center of the circumferential circle of plate (10) is situated on a line connecting the emission point of radiation source (8) with the midpoint of the shaft end face, which line corresponds with the central ray of beam bo. Diffraction element (6) may have any geometrical shape such as a circular or a rectangular or a square shape. The grating sections (14) are part of an annular grating structure having grating strips, also called grating lines that extend in radial directions, i.e. they point to the center of round plate (10). The annular intensity patterns projected by the diffraction element (6) have the same periodicity as the grating sections (14).

Radiation source (8), annular grating structure (14) and detection structure (16) may be included in a module that may be fixed to the static housing of for example a galvanometer scanner.

In the embodiment of FIG. 1 only sub-beams of the first diffraction orders br(+1) and br(−1) are used. Diffraction element (6) can be designed such that a maximum portion of the beam bo is concentrated in these diffraction orders. By means of sub-beams br(+1) and br(−1) two periodic intensity patterns are formed in the plane of two opposed annular grating sections (14), whereby each pattern is respectively formed on one grating section and on the opposed grating section in the same plane. These sections comprise for example alternating transmitting and absorbing strips. The intensity patterns, in FIG. 1 schematically represent by dash lines (18), may be called fingerprints or images of diffraction element (6). The angular period, i.e. the period in tangential direction, or circumferential direction, of these periodic patterns (18) is equal to that of the grating sections (14). Upon rotation of diffraction element (6), due to rotation of shaft (2), periodic patterns (18) move over grating sections (14). Radiations of the sub-beams br(+1) and br(−1), which are transmitted by grating sections (14) are incident on annular radiation-sensitive detector sections (16), which converts these radiations into electrical signals. These signals can be processed in commercially available electronic circuitry, not shown in FIG. 1, to obtain signals representing the angular position of shaft (2).

Since diffraction element (6) projects its periodic images (18) on only relatively small grating sections (14), its diffraction structure can be substantially smaller than that of a conventional grating element which projection image should cover a static grid pattern that extends over 360°. According to the invention this insight is used to substantially reduce the size of diffraction element (6). The diffraction element or hologram may now have a diameter, for example 3 mm, that is substantially smaller than the diameter, for example 30 mm, of the grating sections (14) carrying plate (10). Compared with conventional two grating systems having comparable measurement resolution this provides the advantage of a substantial reduction of the inertial load of the present measuring system on the angular decoder by a factor that is proportional to the square of the ratio of the surface areas of plate (10) and diffraction element (6). This factor may amount to 10000 in this example, provided that plate (10) and element (6) have the same density and the same ratio of thickness and diameter.

Figure 2:
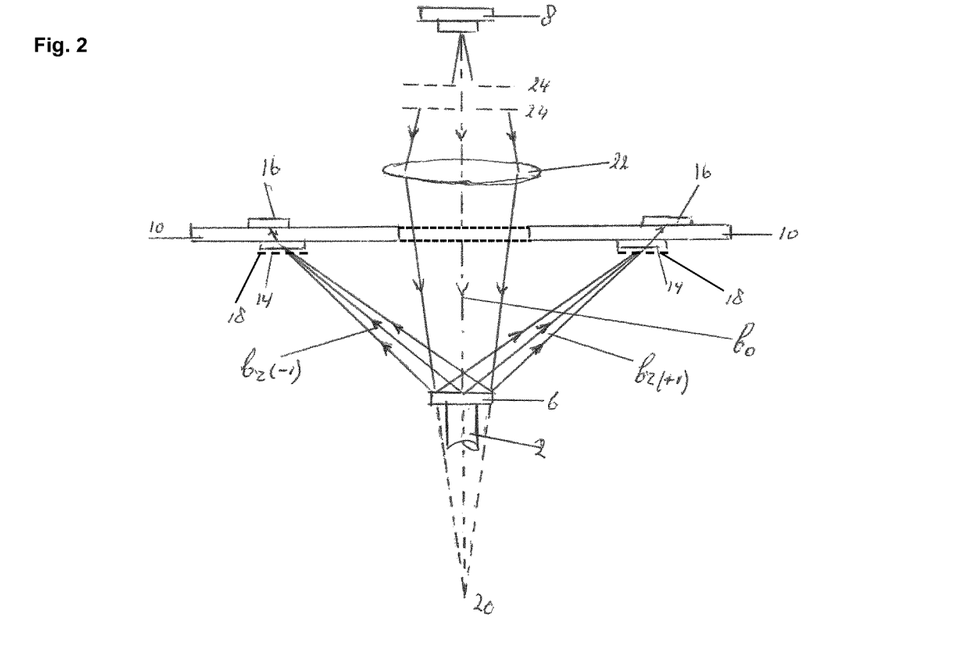
FIG. 2 shows a principle diagram of a second embodiment of the optical system.

The embodiment of the measuring system described by FIG. 1 will show narrow tolerances for transverse movements and expansion of the rotation shaft, caused by the divergent illumination beam. Therefore, it is preferred to use an illumination beam bo that converges in a virtual point (20) at a given distance behind the reflective plane of the diffraction element (6), as is shown in FIG. 2. Such a converging illumination beam may be realized by arranging a converging lens (22) of sufficient power between radiation source (8) and the diffraction element (6). To reduce the size of FIG. 2, only part of the optical path between radiation source (8) and lens (22) has shown in this FIG. 2, which is indicated by the two path interrupting lines (24). To reduce the volume of the system of FIG. 2, the optical path between radiation source (8) and lens (22) can be folded in a well-known way by means of mirrors.

When in the second embodiment the distance between the center (on the rotation axis) of the diffraction element (6) to the average radial position of the diffraction images projected on the gratings 14 is made equal to the distance between said center of element (6) and the virtual image (20) of the illumination source, as shown in FIG. 2, the position of the diffraction images (18) projected by diffraction element (6) on their associated grating sections is independent of transverse displacements of the rotation shaft (2) on which element (6) is fixed. This provides a substantial advantage of the present angular decoder system over conventional angular decoder systems.

Figure 3:
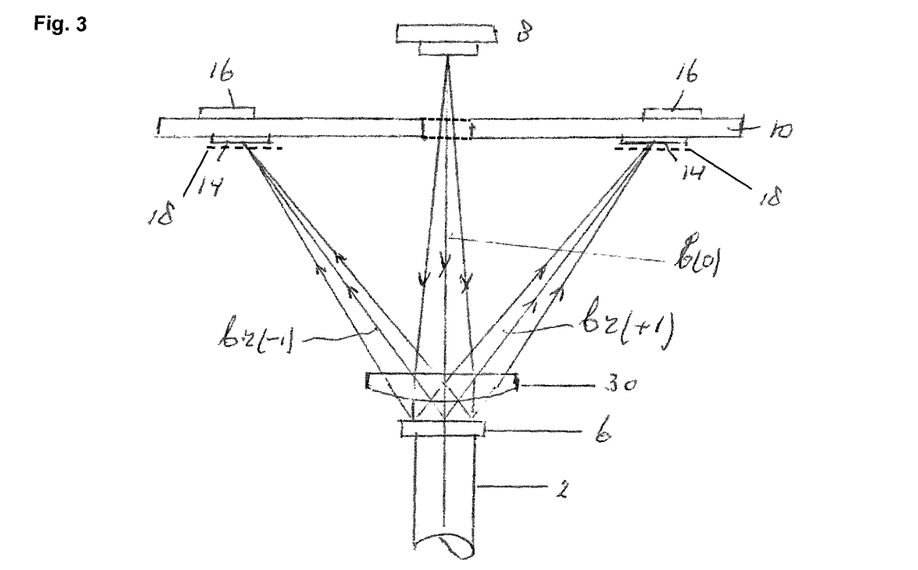
FIG. 3 shows a third embodiment of the optical system wherein a diffraction element is combined with a convergent lens.

Because the diffraction element (6) does not have a focusing function in the embodiment of FIG. 2, axial displacements of element (6), such as can be caused by incorrect mounting, or by expansion of the rotation shaft (2), have a smaller influence on the axial position of the diffraction images (18) than in the embodiment of FIG. 1. In the embodiment of FIG. 2, the axial displacement $\partial z$ of the images (18) as a function of the displacement dz of element (6) is given by $\partial z = dz(1-\cos\theta)$ where $\theta$ is the angle between the illumination beam and the diffracted beams. For example with $\theta = 30°$ $\partial z = 0.14$ dz. In the embodiment shown in FIG. 1, $\partial z = 2dz$, meaning that in the second embodiment we have a large tolerance (for instance 140 μm) for axial displacement of element (6). Moreover the chromatic focusing error $\Delta Z$ is absent in the embodiment shown in FIG. 2 because in this embodiment the diffraction element (6) has no focusing error. The chromatic deflection error is the same as in the embodiment of FIG. 1. In FIG. 2 we do not show the optical path between the laser diode (8) and the focusing lens (21). The length of this optical path is more than 3 times as large as the distance between element (6) and the virtual illumination source (20). The presence of lens (21) and folding elements and the laser diode above the plate (10) makes the volume of the system of FIG. 2 much larger than that of FIG. 1. A solution for this problem, that also results in less components is shown in FIG. 3. In the embodiment of FIG. 3 we have a lens (30), preferably plane-convex with the convex surface facing the diffraction element (6) and the illumination source (8) in the focal point of this lens. The diffraction element (6) is illuminated by a plane wave and has no focusing function; that means that the position of the diffraction images on the gratings (14) is independent of displacements of the diffraction element (6). Also the chromatic focusing error is absent in this embodiment, and the chromatic deflection error is the same as in the embodiments of FIG. 1 and FIG. 2. The system of FIG. 3 can be built much more compact than that of FIG. 2.

For conventional angular decoding systems using a moving grating and a stationary grating of comparable dimensions it has already been proposed to use for the stationary grating pattern three sub-patterns which have slightly different grating periods. Such grating sub-patterns can also be used in the present angular decoding system and then the system allows signal interpolation to improve measurement resolution. The present system allows realizing the three sub-patterns in two different ways.

Figure 4:
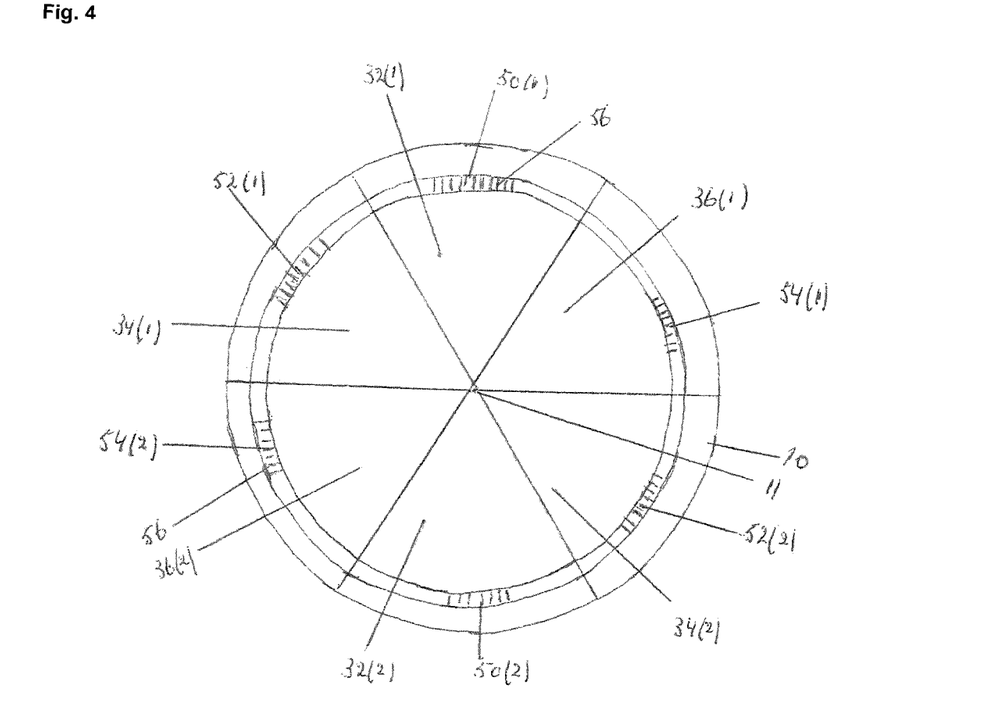
FIG. 4 shows an embodiment of a pattern of static grating sections.

In certain angular decoders, such as for example when applied in a galvanometer scanner, the mirror, thus the rotation shaft (2), has a limited range of rotation, for example the shaft moves between +18° and −18° relative to a zero position. Plate (10) on which the grating sections (14) are arranged can then be divided into angular sectors, for example six sectors of 60° each, as shown in FIG. 4. The center of plate (10) is denoted by reference number (11). The said sectors are arranged in pairs of mutually opposed sectors (32(1)) and (32(2)), (34(1)) and (34(2)), (36(1)) and (36(2)). Each sector is provided with a grating structure, which is called grating section herein above. These grating sections are labeled as (50(1)), (50(2)), (52(1)), (52(2)), (54(1)) and (54(2)) in FIG. 4. Only a few of the grating strips 56 of each grating section are shown in FIG. 4. In reality the number of grating strips is much larger. Opposed grating section pair (50(1)) and (50(2)) have the same grating period and the same holds for grating section pair (52(1)) and (52(2)) and for pair (54(1)) and (54(2)). When diffraction element (6) is rotated the periodic patterns (18) (not shown in FIG. 4, but in FIG. 1) of this element, or fingerprints, move over the grating sections. Moreover, in order to determine the direction of rotation of shaft (2), each grating section may comprise two radially separated sub-grating sections, which are mutually shifted in the angular-, or tangential-, direction over a quarter of the grating period of the relevant grating section.

Figure 5:
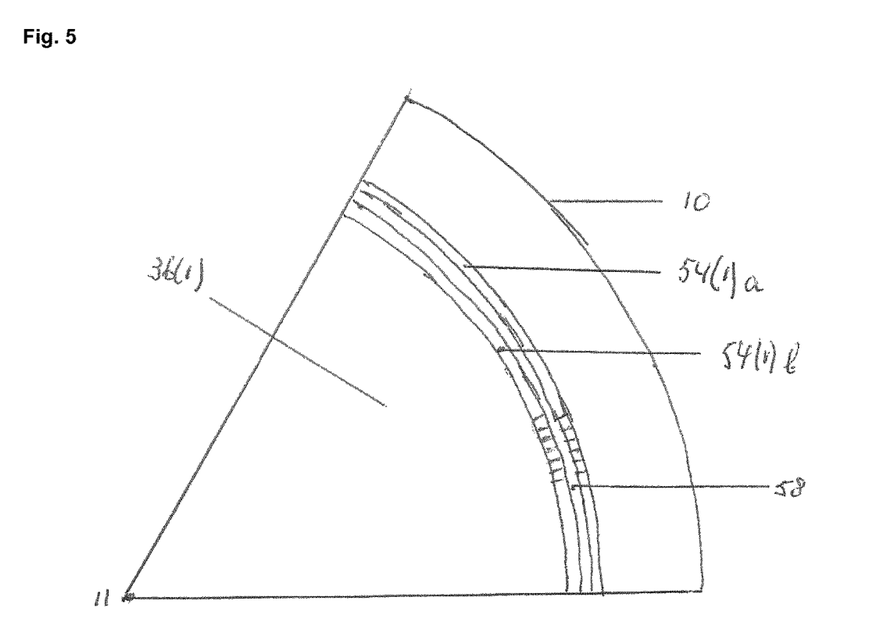
FIG. 5 shows a sub-divided grating structure of one of these sections.

To illustrate this configuration, FIG. 5 shows two such sub-grating sections (54(1)a) and (54(1)b) of one plate section (36(1)), which grating sections are separated by a non-transparent stroke (58). Similar to FIG. 4 only a few of all grating strips (56) of the sub-sections are shown in FIG. 5.

Figure 6:
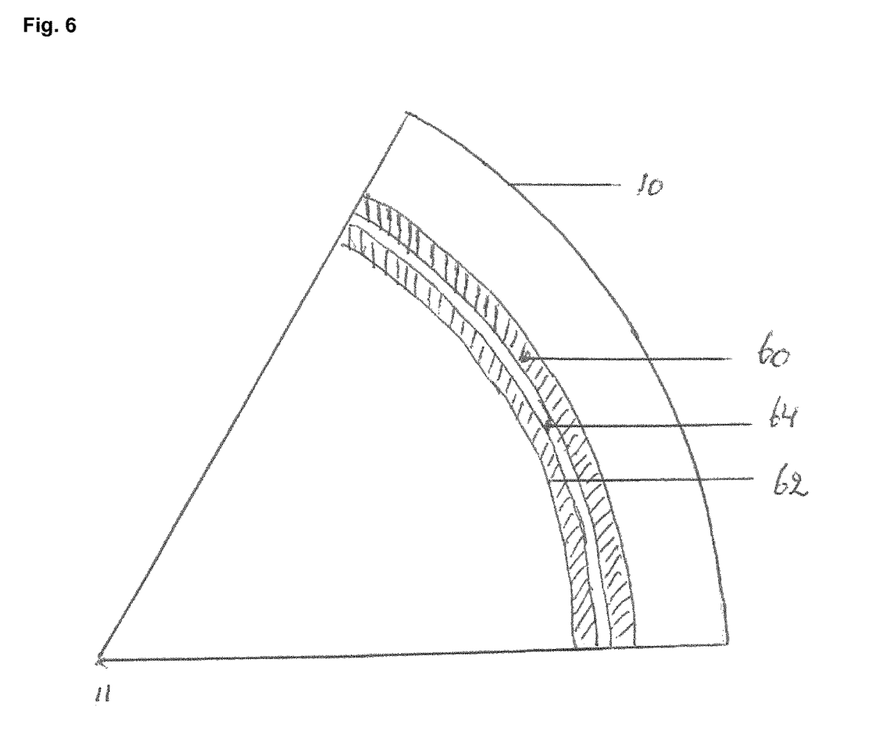
FIG. 6 shows a radiation sensitive detection structure adapted to the sub-divided grating structure.

FIG. 6 shows the radiation-sensitive detector structure at the backside of the plate (10) for plate section (36(1)) for receiving radiation that is transmitted by grating sub-sections (54(1)a) and (54(1)b) of FIG. 5 and for converting this radiation into electric signals for further electronic processing. The detector structure, which is part of the detector (14) shown in FIGS. 1 and 2, comprises two detector portions (60) and (62) separated in the radial direction by a radiation-insensitive zone (64). It will be clear that in case the six disc sections of FIG. 4 each comprise two sub-gratings the complete detector structure comprises twelve detector portions, like portion (60).

In case plate (10) comprises three pairs of opposed sections for gratings, as shown in FIG. 4, each pair may be provided with a different one of the above-mentioned three sub-patterns having different grating periods. This is a first way to incorporate such sub-patterns in the present decoder system. Grating sections (50(1)) and (50(2)) in disc sections (32(1)) and (32(2)) in FIG. 4 may have $1/6 \cdot 2^N$ grating periods over their angular length, which in the present embodiment is 60°. Then the number of grating periods of grating sections (52(1)) and (52(2)) may be $1/6 \cdot (2^N-1)$ and those of grating sections (54(1)) and (54(2)) may be $1/6 \cdot (2^N-2^6)$, respectively over their angular length. A value of N=12, have been used before for a system with a rotating grating and fixed grating of comparable dimensions. With N=12 the number of grating periods for an annular length of $2\pi$ rad. is $2^N$=4096. Since the grating patterns with different frequencies are stored in sectors of 60°, the number of grating periods for a sector is lowered by a factor $1/6$.

Figure 7:
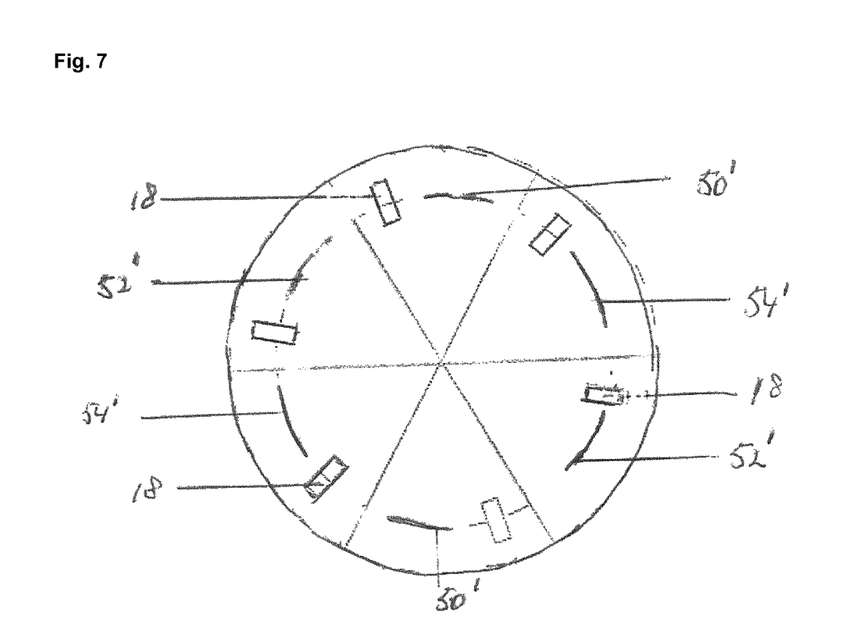
FIG. 7 shows a projection of image patterns on their associated section gratings.

This number can be further lowered in practice, for example if the scanning range of the associated galvanometer is between +18° and −18° an angular length of 40° for the grating sections will suffice. This means that the number of grating periods may be further reduced by a factor $2/3$. It will be clear that the grating period of the periodic image patterns 18 corresponds to that of the grating sections (50(1)-54(2)). In a practical embodiment the image patterns 18 may have an angular size of 10° and its radial size may be 100 μm. This situation is illustrated in FIG. 7, which shows a schematic diagram of the sectioned plate 10 with six grating sections, which are represented by their radial middle lines (50'), (52') and (54'). If the grating sections comprise only one grating as shown in FIG. 4, these middle lines are the annular middle of the gratings. In case the grating sections comprise two radially separated and angularly shifted sub-gratings, as shown in FIG. 5 the middle lines represent the middle of non-transparent stroke (58).

In the embodiment with six grating sections the image patterns are positioned at mutually angular distances equal to the angular size of the sectors, thus at 60°. If these sections pairs comprise gratings with slightly different grating periods, as discussed herein above, the image patterns of diffraction element 6 may be simple radial line patterns.

Instead of using angularly small image patterns 18 and angularly larger grating sections (50(1))-(54(2)) as shown in FIG. 7, it is also possible to use the combination of angularly larger image patterns and angularly smaller grating sections. The latter provides the advantage that angularly smaller, and thus cheaper, radiation-sensitive detectors can be used.

Figure 8:
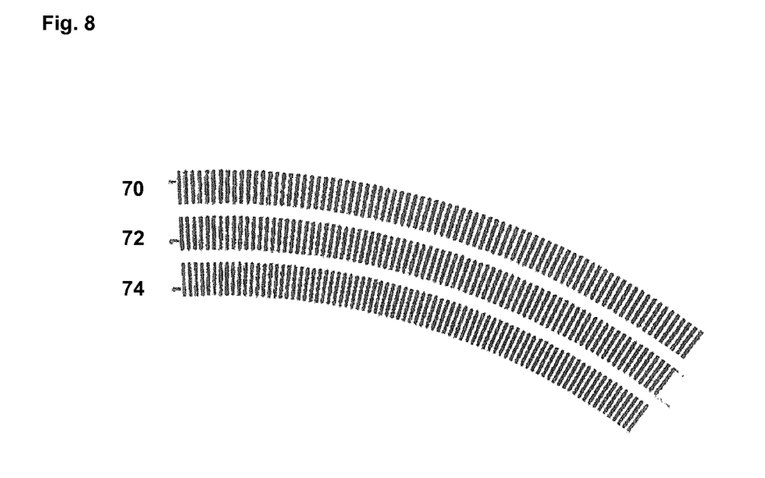
FIG. 8 shows a section grating structure, having sub-gratings with different grating periods.

The principle of the present angular decoder system can also be realized with only two or even one grating section(s). The gratings with slightly different grating periods, needed for signal interpolation, can then be arranged in each of these grating sections, such that these gratings are located at different radii and radially separated from each other. A grating structure for such grating section is shown in FIG. 8. The gratings having different grating periods are denoted by reference numbers (70), (72) and (74). In practice the number of grating lines is larger than shown in FIG. 7. Since gratings (70), (72) and (74) are arranged at different radii, the periods of these gratings are also adapted to their radius.

Elements (18) in FIG. 7 represent the small image patterns of the diffraction element. The grating section of FIG. 7 may extend over 40°. In the embodiment wherein this grating section structure is used the image pattern(s) (18) should comprise three ring-shaped and radially separated gratings.

For all embodiments holds that since the image patterns of the diffraction element contain periodic intensity patterns, for example of 114 periods when N=14, and the section gratings are also periodic with the same period, the detector signals are periodic correlation functions of the image patterns and the section gratings.

If the section gratings are binary gratings with duty cycle 0.5, the measurement signals will be essentially sinusoidal with an angular frequency equal to that of the sections gratings and with an acceptable admixture of a component generated by third order diffraction radiation. The sinusoidal signal enables interpolation of the angular position measurement.

Figure 9:
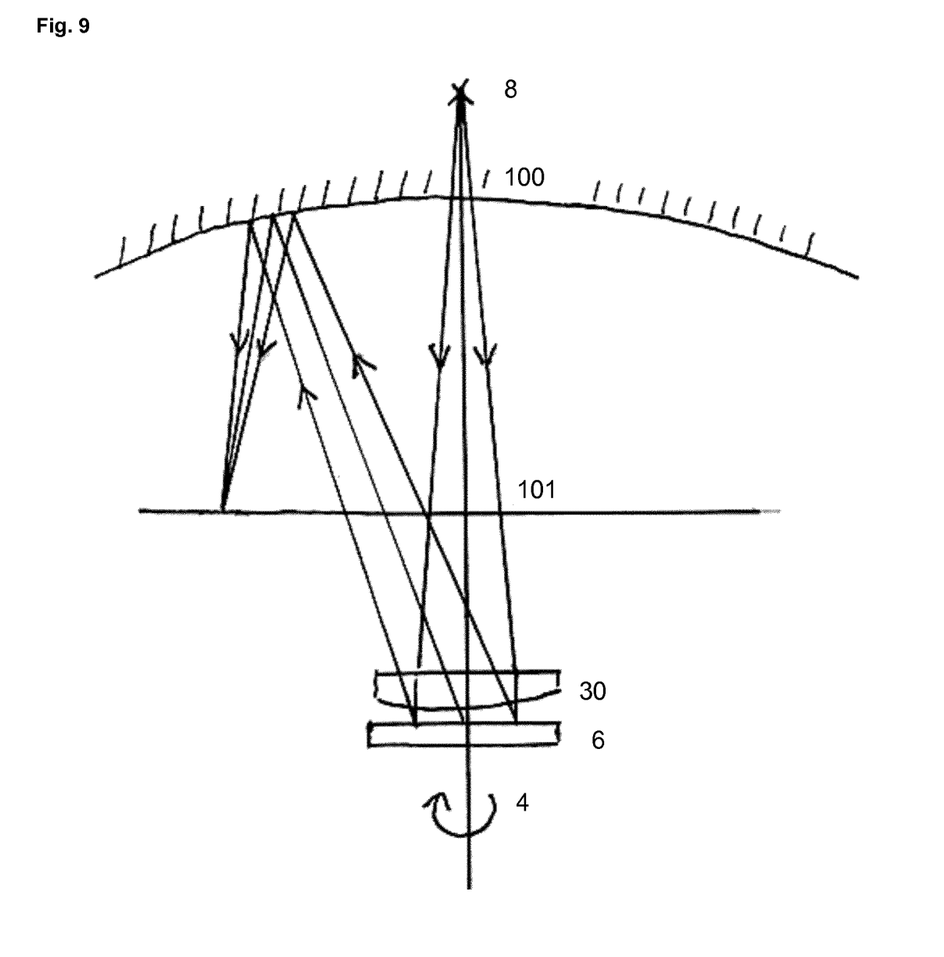
FIG. 9 shows in an additional embodiment a principle diagram of the optical system wherein a spherical mirror is added.

In another embodiment of the present invention, and as outlined in FIG. 9, a spherical mirror (100) is added to the system of the present invention. In particular, said spherical mirror (100) projects a periodic pattern on a set of detectors. The detector plane (101) can be made flat and perpendicular to the symmetry axis of the system. This makes alignment of the system simpler and also improves the quality of the detector signals. With this configuration it is indeed easier to have the detector plane (101) coincide with the face of plate (10) carrying the detection structures (16).

The invention claimed is:

1. An optical system for measuring a rotation angle of a rotatable object having a rotation shaft, the optical system comprising:
    a reflective diffraction element mounted on, and rotatable with, the rotation shaft;
    a module that comprises a radiation source that emits an illumination beam of nearly monochromatic radiation toward the diffraction element; and
    a radiation-sensitive detection structure that converts illumination beam radiation reflected by the reflective diffraction element into electrical signals suitable for electronic processing to obtain signals representing the rotation angle,
wherein:
    the reflective diffraction element is configured to project one or more diffraction images onto associated sections of the radiation-sensitive detection structure; and
    the surface size of the diffraction element is smaller than 20% of the surface size of the associated sections on the radiation-sensitive detection structure.

2. The optical system of claim 1, wherein:
    the associated sections of the detection structure are associated sections of an annular grating structure of the radiation-sensitive detection structure; and
    the surface size of the reflective diffraction element is smaller than 20% of the surface size of the annular grating structure.

3. The optical system of claim 2, wherein an optical distance between the radiation source and the center of the diffraction element is equal to an optical distance between the center of the diffraction element and a radial center of an annular grating structure section.

4. The optical system of claim 1, wherein the diffraction element is configured to reflect incident measuring beam radiation in the +1 and 1 diffraction orders.

5. The optical system of claim 1, wherein the illumination beam incident on the diffraction element is a convergent beam converging in a virtual plane behind the diffraction element.

6. The optical system of claim 1, wherein the diffraction element is a hologram.

7. The optical system of claim 1, wherein the module comprises a plane-convex lens having a convex surface facing the reflective diffraction element.

8. The optical system of claim 2, wherein:
the annular grating structure comprises one or more grating sectors having an angular size that is larger than the angular size of diffraction order images formed on the grating sectors; and
each grating sector comprises a sector detector.

9. The optical system of claim 8, wherein:
the annular grating structure comprises two radially separated sub-gratings having identical grating periods and being mutually shifted in a tangential direction over a quarter of the grating period; and
each of the two radially separated sub-gratings comprises a separate detector.

10. The optical system of claim 8, wherein the annular grating structure comprises three pairs of sub-gratings having different grating periods and each adapted to receive a diffraction order image.

11. The optical system of claim 2, wherein:
the annular grating structure comprises one or more grating sectors having an angular size that is smaller than the angular size of diffraction order images formed on the grating sectors; and
each grating sector comprises a sector detector.

12. The optical system of claim 11, wherein:
the annular grating structure comprises two radially separated sub-gratings having identical grating periods and being mutually shifted in a tangential direction over a quarter of the grating period; and
each of the two radially separated sub-gratings comprises a separate detector.

13. The optical system of claim 11, wherein the annular grating structure comprises three pairs of sub-gratings having different grating periods and each adapted to receive a diffraction order image.

14. The optical system of claim 13, wherein the annular grating structure comprises three pairs of sectors, each pair being provided with one of the three sub-gratings having different grating periods.

15. The optical system of claim 13, wherein the annular grating structure comprises at most two sectors, each sector being provided with the three pairs of sub-gratings having different grating periods, which sub-gratings are radially separated.

16. The optical system of claim 1, further comprising a spherical mirror.

* * * * *

UNITED STATES PATENT AND TRADEMARK OFFICE
CERTIFICATE OF CORRECTION

| | |
|---|---|
| PATENT NO. | : 10,634,523 B2 |
| APPLICATION NO. | : 16/098017 |
| DATED | : April 28, 2020 |
| INVENTOR(S) | : Markus Guggenmos et al. |

It is certified that error appears in the above-identified patent and that said Letters Patent is hereby corrected as shown below:

In the Specification

In Column 5, Line(s) 42, after "wavelength of", insert -- $\tau$ --.

In the Claims

In Column 12, Line(s) 67, Claim 4, after "and" delete "1" and insert -- −1 -- therefor.

Page 1 of 1

Signed and Sealed this
First Day of September, 2020

Andrei Iancu
*Director of the United States Patent and Trademark Office*